Sept. 1, 1936.  E. C. VILLIERS  2,052,910
COURSE RECORDER
Filed Aug. 7, 1930   2 Sheets-Sheet 2
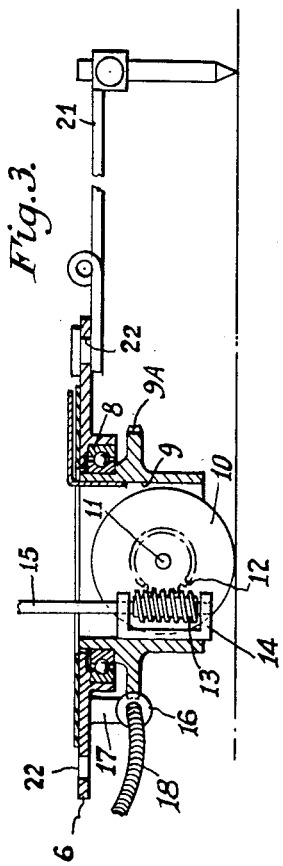
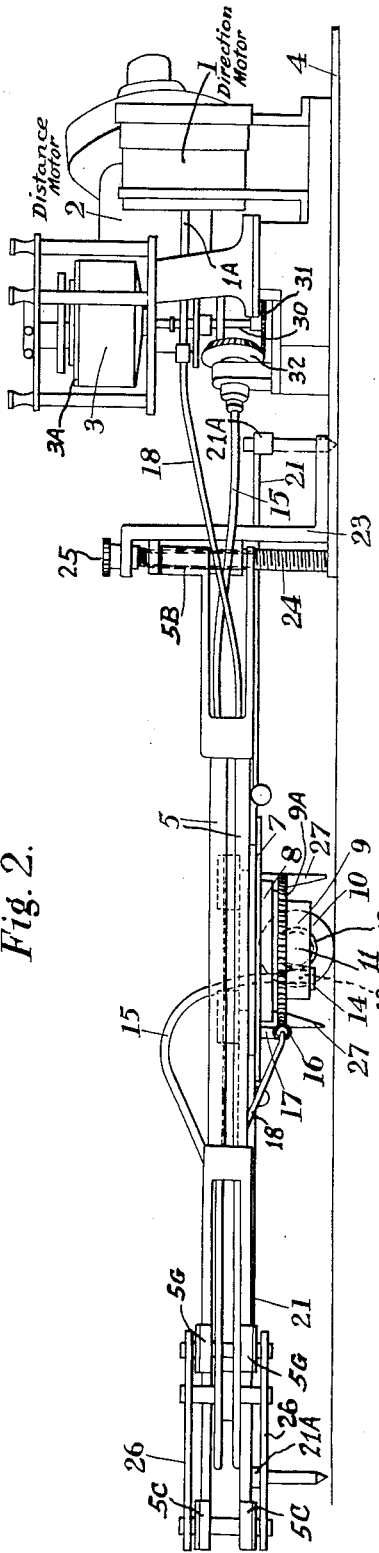

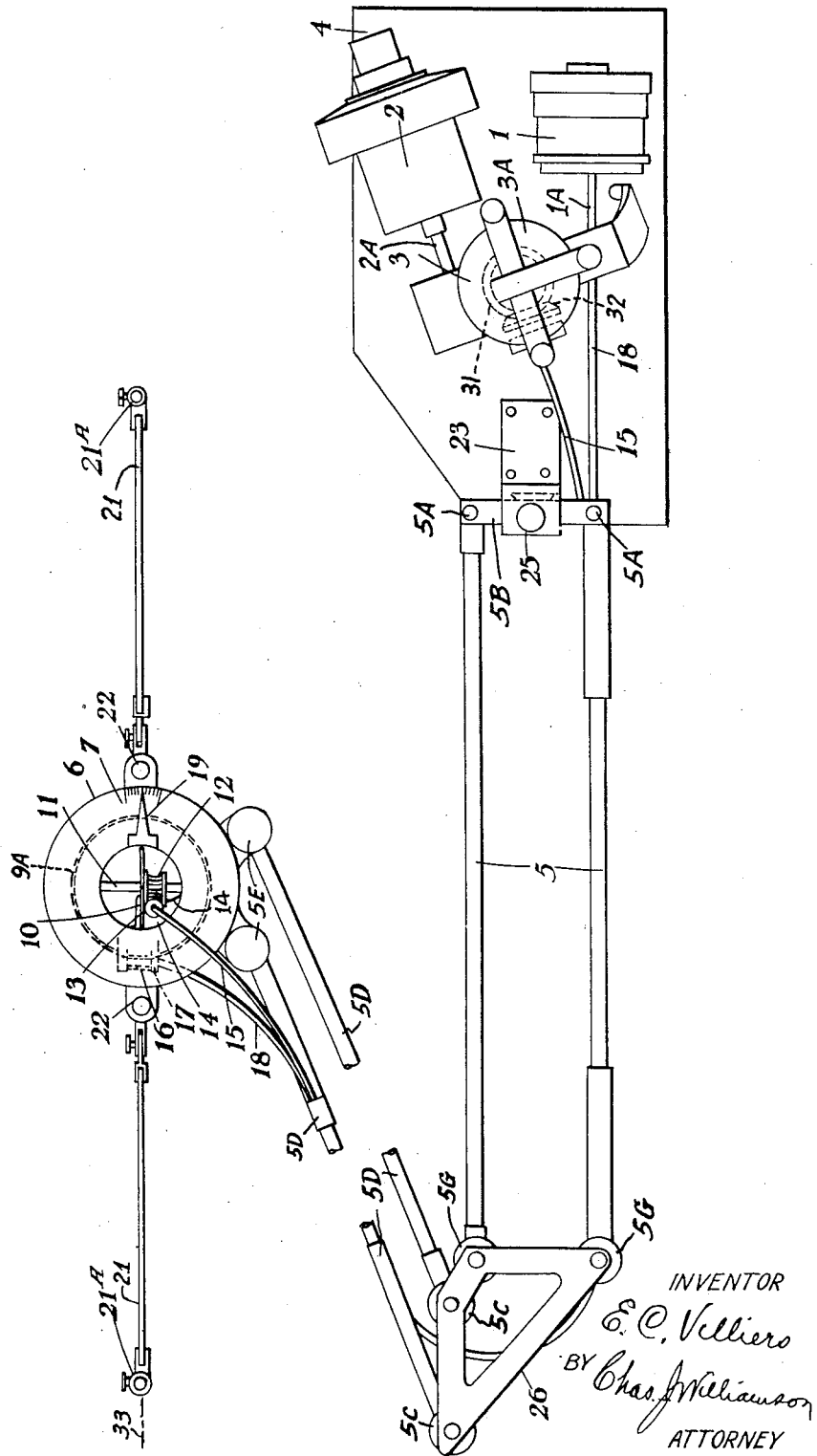

Patented Sept. 1, 1936

2,052,910

UNITED STATES PATENT OFFICE 2,052,910

COURSE RECORDER

Edward Cecil Villiers, Bishop's Stortford, England

Application August 7, 1930, Serial No. 473,668
In Great Britain August 15, 1929

1 Claim. (Cl. 234—26)

This invention relates to course recorders which automatically draw the track of a vessel or vehicle or aircraft on a chart or paper fixed on to a table or flat surface, and the object of my invention is to provide a course recorder of much improved construction and operation.

In my previous instruments I have held a traveller, which carries a pencil or stylus, to the chart table by means of hold down magnets attached to the traveller and an iron plate under the chart in order to prevent slipping when the chart table is inclined.

Another object of this invention, therefore, is to enable the iron plate, together with the hold down magnets, to be discarded and thus make the apparatus lighter, and suitable for use on any table without an iron plate, and also to reduce the marks of the traveller on the surface of the chart.

To obtain these results I make the traveller as light as possible, using very light metals or materials, and I mount the traveller on a movable arm or arms which are anchored at the other end by means which depress the traveller onto the chart with a force additional to its weight.

Also, an azimuth motor is provided for directing the traveller synchronously, i. e. unidirectionally with the compass, and a motor solenoid and clutch for driving the traveller, proportionally to the speed of the vessel and to the scale of the chart, are mounted at the base of arms which hold the frame of the traveller with a graduated disc in the true position of the points of the compass.

The movements of the azimuth motor, and the electromagnetic clutch are transmitted to the traveller by means of flexible drives passing through the arms.

One constructional form of the invention for use on board ship is shown, by way of example, on the accompanying drawings, whereon:—

Fig. 1 is a plan view of the apparatus;

Fig. 2 is an elevation thereof; and

Fig. 3 is a detail view in vertical section on a larger scale of the traveller.

Referring to the drawings:

The apparatus comprises a reversible azimuth electric motor 1 which is connected to the repeating system of a compass of known construction, the shaft 1ᴬ of the motor, therefore, being caused to rotate in one direction or the other according to the direction in which the ship is sailing.

The apparatus also comprises a motor solenoid 2 (such as described in the specification of my United States Patent No. 1,361,935), the coil of which is connected to circuit making and breaking means actuated by the electric log of the ship. The solenoid has a reciprocable core, the extension 2ᴬ of which is connected to the oscillatable casing 3 of an electro-magnetic clutch (such as described in the specification of my British Patent No. 124,618). The motor solenoid and the clutch are arranged to be energized simultaneously by impulses from the electric log so that when the core of the solenoid is moved owing to the solenoid being energized, the casing 3, which is loosely mounted on a shaft 30, of the electromagnetic clutch, is turned.

At this moment a clutch plate 3ᴬ, which is rigidly fixed on the shaft 30, is magnetically engaged with the casing and, thus, turns in company with the latter. Through gearing 31 and 32, the shaft 30 is connected to a flexible drive 15, referred to hereinafter. When, however, the coils of the solenoid 2 and clutch 3 are de-energized, the clutch plate 3ᴬ and casing 3 then being disconnected, a spring (not shown) carries the casing 3 and the core of the solenoid backwards to their original positions without, of course, rotating the shaft 30. In this manner, the flexible drive 15 is only rotated unidirectionally, and each impulse from the electric log gives a ratchet like movement to the casing 3.

The solenoid 2, clutch 3, and reversible motor 1 are mounted upon a plate 4 adjacent to the ends of arms 5, which are pivotally connected by ball-bearings 5ᴬ to a cross piece 5ᴮ having threaded through it a screw 24 turnably supported by a bracket 23 and having a head 25 whereby it may be turned. The outer ends of the rods 5 are pivotally connected by ball bearings 5ᴳ to linking plates 26 to which are also pivotally connected, through ball bearings 5ᶜ, the adjacent ends of other rods 5ᴰ, the opposite ends of which are pivotally connected by ball bearings 5ᴱ projecting from the side of a horizontally disposed annular plate 6, which forms the body or supporting frame of the traveller. To the under side of the plate 6, and concentric with the center opening therein, is secured the outer retaining casing of the ball race 8.

The traveller further comprises a turntable 9 in the form of a sleeve-like member having its upper end fast to the inner casing of the ball race 8. A traction wheel 10 is disposed in the sleeve and mounted fast on a horizontally disposed spindle 11, journalled at its ends in opposite wall positions of the sleeve so that the lower portion of the wheel 10 contacts and runs over the surface or chart below. A worm wheel 12 is fixed on the spindle and engaged and turned by a worm 13 mounted in a suitable support 14 projecting inwardly from the inner surface of the sleeve forming the turntable 9, said worm being operatively connected to the unidirectionally driven flexible drive 15, referred to above. The worm 13, therefore, is adapted to be rotated proportionately to the speed of the ship and to the scale of the chart.

The turntable 9 is provided externally with a tooth ring 9A which is engaged and rotated by a worm 16 carried by a bracket 17 attached to the plate 6, said worm being driven by a flexible drive 18 operatively connected to the shaft 1A of the reversible azimuth motor 1. The worm 16, therefore, is adapted to be rotated in one or the other direction according to the direction in which the ship is being steered.

Owing to the driving connections described above, the tractive wheel 10 is thus moved over the chart in accordance with the actions of the motor 1 and log-controlled solenoid 2 and electromagnetic clutch 3.

A pointer 19 is provided which is fixed to the turntable 9 and extends substantially parallel with the surface of a graduated annular disc 7 disposed on the non-rotating frame plate 6 of the traveller, whereby the pointer 19 moves over the disc 7 according to the movement of the turntable 9, indicating the compass direction in which the tractive wheel 10 is lying.

Two pencil carrying arms 21 are connected at 22 to the plate 6 and extend from diametrically opposite sides of the plate 6. Only one pencil 21A is used at a time, but the two carriers are provided in order that a larger reach be possible, enabling the recorder to cover a larger chart than otherwise. For instance, if the left hand pencil 21A, (Fig. 1) can be moved to the right hand edge of a chart beneath it, the right pencil 21A will then move well beyond such edge, actually a distance equal to that between the two pencils. Consequently, the size of the chart could be larger by that amount, and the recorder would still be capable of covering it.

The recording made by the pencil for the position of the tractive wheel 10 shown in Fig. 1, is indicated at 33 in the said figure, where the break in line represents a change in course.

The rods 5 are tubular so that the flexible drives 15 and 18 may be passed through them. If desired, as shown in Fig. 2, for the sake of rigidity, an upper and a lower set of rods 5 and link plates 26, may be used.

It will thus be manifest that the wheel 10 is constantly pressed against the chart by the pressure applied to the arms 5 and 5D by the parts 24 and 25 to prevent slipping when a ship rolls or an airplane banks in order that it may be operated automatically and accurately from the log and the compass. By means of the frictional contact of the wheel with the surface of the chart the traveller means (which might be the wheel itself) maintains its position accurately on the chart at all times and thus enables the traveller which is maintained in azimuth by the linkage arms to be tractively and automatically driven in any compass direction from the compass and the log.

Pointers 27 attached to the plate 6 indicate when the traveller is in alinement with the, say, north and south, lines of the chart.

From the above it will be clear that the traction wheel 10 is revolvable about a horizontal axis in the opening of the plate 6 so that, when the wheel is propelled by the shaft 15, it may move in all directions over the chart surface, the pencil 21A which is being used, moving correspondingly.

Having thus described the invention with reference to one of its preferred embodiments, it is to be understood that the invention is not to be limited to this embodiment but may be modified, changed and varied in whatever manner desired which falls within the scope of the appended claim.

I claim:

A recorder to produce a line record on a fixed line receiving surface, comprising a traveller movable in all directions parallel with the plane of such surface, line producing means contacting such surface and connected to and moving with the traveller in whatever direction it moves, means arranged apart from said traveller to propel it over such surface in accordance with a variable quantity and having a driving connection with the traveller, means arranged apart from said traveller for varying its direction of movement in accordance with variation in another variable quantity and having an operating connection with the traveller, and means for supporting the traveller for movement parallel with the plane of the line receiving surface and exerting pressure thereon towards such surface, said last means comprising an arm connection between the traveller and a stationary support with which the arm connection is connected for movement parallel with the line receiving surface, whereby, by means of said arm connection, contact of the line producing means with such line-receiving surface is maintained and aberration of the record is prevented while the recorder is in operation.

EDWARD CECIL VILLIERS.